(12) United States Patent
Kosugi et al.

(10) Patent No.: US 11,310,663 B2
(45) Date of Patent: Apr. 19, 2022

(54) AUTHENTICATION SYSTEM AND AUTHENTICATION METHOD

(71) Applicant: KABUSHIKI KAISHA TOKAI RIKA DENKI SEISAKUSHO, Aichi (JP)

(72) Inventors: Masanori Kosugi, Aichi (JP); Satoshi Mori, Aichi (JP); Kenichi Koga, Aichi (JP); Kazuki Naiki, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 402 days.

(21) Appl. No.: 16/556,717

(22) Filed: Aug. 30, 2019

(65) Prior Publication Data
US 2020/0084625 A1 Mar. 12, 2020

(30) Foreign Application Priority Data

Sep. 6, 2018 (JP) .............................. JP2018-166727

(51) Int. Cl.
*H04L 29/06* (2006.01)
*H04W 12/06* (2021.01)
(Continued)

(52) U.S. Cl.
CPC ........... *H04W 12/06* (2013.01); *H04L 9/3271* (2013.01); *H04W 4/48* (2018.02); *H04W 12/033* (2021.01);
(Continued)

(58) Field of Classification Search
None
See application file for complete search history.

(56) References Cited

U.S. PATENT DOCUMENTS 7,382,882 B1 * 6/2008 Immonen .......... H04W 12/0433
380/270
8,307,455 B2 * 11/2012 Takahashi ............. H04L 9/3271
726/27
(Continued)

FOREIGN PATENT DOCUMENTS

JP 2012-193499 10/2012
JP 2015-089992 5/2015

OTHER PUBLICATIONS

Zhang, Zongfu. Design and implementation of dual-factor authentication file encryption system based on smart-phone. 2012 IEEE Symposium on Electrical & Electronics Engineering (EEESYM). https://ieeexplore.IEEE.org/stamp/stamp.jsp?tp=&arnumber=6258750 (Year: 2012).*

(Continued)

*Primary Examiner* — Jeremiah L Avery
(74) *Attorney, Agent, or Firm* — Greenblum & Bernstein, P.L.C.

(57) ABSTRACT

An authentication system includes a first controller that performs wireless communication with a mobile terminal and a first authentication unit that executes authentication of the mobile terminal including ID authentication and code authentication through the wireless communication performed between the first controller and the mobile terminal. The first authentication unit executes the code authentication by determining whether a terminal-side calculation result obtained by the mobile terminal matches a controller-side calculation result obtained by the first controller. The authentication system further includes a second controller that communicates with the mobile terminal and a second authentication unit that applies encryption communication using a portion of the terminal-side calculation result and a portion of the controller-side calculation result to commu-
(Continued)

nication performed between the second controller and the mobile terminal and authenticates the encryption communication.

9 Claims, 2 Drawing Sheets

(51) Int. Cl.
    *H04L 9/32*     (2006.01)
    *H04W 24/08*     (2009.01)
    *H04W 4/48*     (2018.01)
    *H04W 12/033*     (2021.01)
    *B60R 25/24*     (2013.01)

(52) U.S. Cl.
    CPC .............. *H04W 24/08* (2013.01); *B60R 25/24* (2013.01); *B60R 2325/108* (2013.01); *H04L 2209/80* (2013.01); *H04L 2209/84* (2013.01)

(56) References Cited

U.S. PATENT DOCUMENTS

| | | | |
|---|---|---|---|
| 2016/0099927 A1* | 4/2016 | Oz | G07C 5/0808 726/9 |
| 2016/0280184 A1 | 9/2016 | Katou et al. | |
| 2017/0075636 A1* | 3/2017 | Chang | H04N 1/00307 |
| 2018/0310174 A1* | 10/2018 | Rougier | H04W 12/06 |

OTHER PUBLICATIONS

Norman, Jasmine; Joseph, Paulraj. Secure neighbour authentication in wireless sensor networks. 2011 2nd International Conference on Wireless VITAE. https://ieeexplore.IEEE.org/stamp/stamp.jsp?tp=&arnumber=5940835 (Year: 2011).*

Huda, Samsul et al. Secure data exchange using authenticated Ciphertext-Policy Attributed-Based Encryption. 2015 International Electronics Symposium (IES). https://ieeexplore.ieee.org/stamp/stamp.jsp?tp=&arnumber=7380829 (Year: 2015).*

* cited by examiner

AUTHENTICATION SYSTEM AND AUTHENTICATION METHOD

BACKGROUND

1. Field

The present disclosure relates to an authentication system and an authentication method.

2. Description of Related Art

A typical authentication system authenticates a mobile terminal carried by a user through wireless communication performed between the mobile terminal and an on-board device mounted on a vehicle to control the vehicle. An example of the authentication system is a smart authentication system in which an automatic response of the mobile terminal to a radio wave transmitted from the on-board device starts smart verification to execute ID authentication of the mobile terminal through wireless communication performed between the mobile terminal and the on-board device.

Japanese Laid-Open Patent Publication No. 2012-193499 discloses an authentication system that executes challenge-response authentication. The challenge-response authentication is executed by transmitting a data sequence from one of the on-board device and the mobile terminal to the other, calculating a code from the data sequence and an encryption code in each of the on-board device and the mobile terminal, and comparing the two codes. This determines whether the mobile terminal that has established communication is legitimate.

For example, a mobile terminal may communicate with multiple on-board devices. In this case, it is desirable that the authentication system execute authentication for each communication performed between the mobile terminal and each on-board device. However, if authentication is executed for each communication performed between the mobile terminal and each on-board device, the number of processes executed for the communications increases.

SUMMARY

It is an objective of the present disclosure to provide an authentication system and an authentication method that limit increases in a number of processes executed for communication.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An embodiment of an authentication system includes a first controller that performs wireless communication with a mobile terminal and a first authentication unit that executes authentication of the mobile terminal including identification (ID) authentication and code authentication through wireless communication performed between the first controller and the mobile terminal. The first authentication unit executes the code authentication by transmitting a data sequence from one of the mobile terminal and the first controller to the other of the mobile terminal and the first controller, obtaining a terminal-side calculation result from the data sequence and an encryption code by the mobile terminal, obtaining a controller-side calculation result from the data sequence and the encryption code by the first controller, and determining whether the terminal-side calculation result matches the controller-side calculation result. The authentication system further includes a second controller that communicates with the mobile terminal and a second authentication unit that applies encryption communication using a portion of the terminal-side calculation result and a portion of the controller-side calculation result to communication performed between the second controller and the mobile terminal and authenticates the encryption communication.

An embodiment of an authentication method includes executing authentication of a mobile terminal including identification (ID) authentication and code authentication through wireless communication performed between a first controller and the mobile terminal, the code authentication including transmitting a data sequence from one of the mobile terminal and the first controller to the other of the mobile terminal and the first controller, obtaining by the mobile terminal a terminal-side calculation result from the data sequence and an encryption code, obtaining by the first controller a controller-side calculation result from the data sequence and the encryption code, and determining whether the terminal-side calculation result matches the controller-side calculation result, and applying encryption communication that uses a portion of the terminal-side calculation result and a portion of the controller-side calculation result to communication performed between the second controller and the mobile terminal and authenticating the encryption communication.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An embodiment of an authentication system and an authentication method will now be described with reference to FIGS. 1 to 4.

Figure 1:
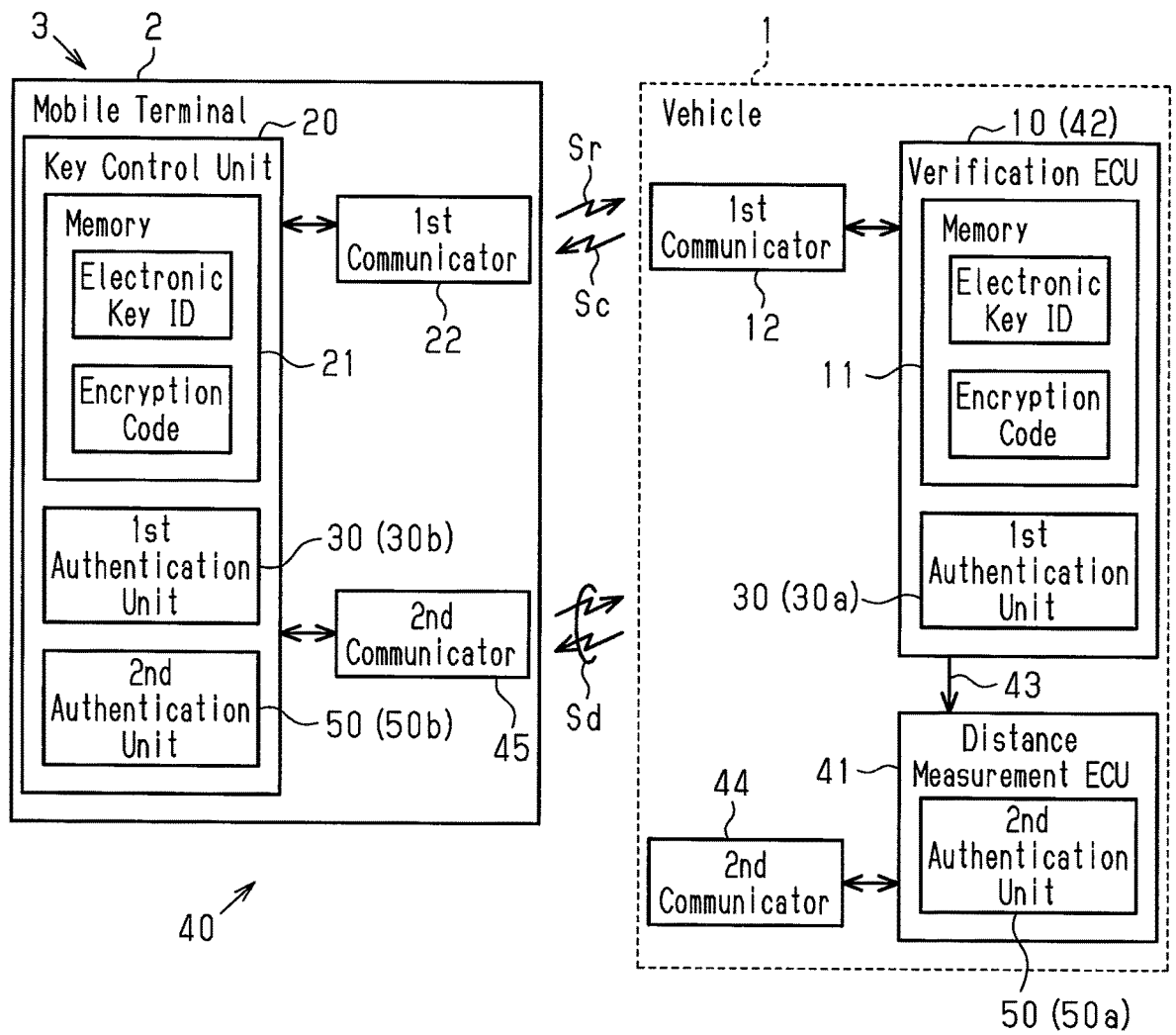
FIG. 1 is a block diagram schematically illustrating an embodiment of an authentication system.

As illustrated in FIG. 1, a vehicle 1 and a mobile terminal 2 are configured to perform wireless communication with each other. Each of the vehicle 1 and the mobile terminal 2 includes a component that establishes an authentication system 3. In the authentication system 3, for example, the vehicle 1 determines the validity of the mobile terminal 2 to authenticate the mobile terminal 2 and allows and controls actuation of an on-board device (not illustrated) based on accomplishment of the authentication. In the present example, the authentication system 3 is established as a smart authentication system. In the smart authentication system, for example, the vehicle 1 starts to perform wireless communication with the mobile terminal 2 and authenticates the mobile terminal 2 in accordance with an authentication communication sequence performed between the vehicle 1 and the mobile terminal 2. In the smart authentication system, the verification process for authenticating the mobile terminal 2 is referred to as a smart verification. In the present example, the mobile terminal 2 is an electronic key. Examples of the on-board device include a door lock device (not illustrated) that controls locking and unlocking of the vehicle 1 and an engine (not illustrated) of the vehicle 1 but are not limited to these. The authentication of the mobile terminal 2 (in the present example, smart verification) includes identification (ID) authentication and code authentication.

The vehicle 1 includes a verification ECU (electronic control unit) 10, which corresponds to a first controller that authenticates the mobile terminal 2. The verification ECU 10 includes memory 11 storing an electronic key ID and an encryption code. The electronic key ID is identification information registered to the vehicle 1 and unique to the mobile terminal 2 and is used in the ID authentication. The encryption code is used in the code authentication executed through wireless communication performed between the mobile terminal 2 and the verification ECU 10.

The vehicle 1 includes a first communicator 12 that performs wireless communication between the mobile terminal 2 and the verification ECU 10. The authentication of the mobile terminal 2 (in the present example, smart verification) is executed through bidirectional communication performed between the mobile terminal 2 and the verification ECU 10. In this case, for example, the first communicator 12 may include a transmitter that transmits low frequency (LF) radio waves and a receiver that receives ultra-high frequency (UHF) radio waves.

The mobile terminal 2 includes a key control unit 20 that controls actuation of the mobile terminal 2. The key control unit 20 includes memory 21 also storing the electronic key ID and the encryption code described above. The mobile terminal 2 further includes a first communicator 22 that performs wireless communication between the mobile terminal 2 and the verification ECU 10. When the authentication of the mobile terminal 2 (in the present example, smart verification) is executed through bidirectional communication performed between the mobile terminal 2 and the verification ECU 10, for example, the first communicator 22 may include a receiver that receives LF radio waves and a transmitter that transmits UHF radio waves.

For example, the first communicator 12 of the vehicle 1 regularly or irregularly transmits a wake signal as an LF radio wave. In response to reception of the wake signal, the mobile terminal 2 is activated from a standby state and transmits an ack signal (acknowledge signal) as a UHF radio wave. In response to reception of the ack signal, the verification ECU 10 starts the smart verification (authentication of the mobile terminal 2). In the present example, in the smart verification, the ID authentication and the code authentication are executed through LF-UHF bidirectional communication preformed between the mobile terminal 2 and the verification ECU 10.

The authentication system 3 includes a first authentication unit 30 that executes the authentication of the mobile terminal 2 including the ID authentication and the code authentication through wireless communication performed between the mobile terminal 2 and the verification ECU 10. For example, the first authentication unit 30 executes the ID authentication by receiving the electronic key ID from the mobile terminal 2 and comparing the received electronic key ID with the electronic key ID stored in the memory 11 of the verification ECU 10. The first authentication unit 30 also executes the code authentication by transmitting a data sequence from one of the mobile terminal 2 and the verification ECU 10 to the other, calculating a terminal-side calculation result in the mobile terminal 2 from the data sequence and the encryption code stored in the memory 21, calculating a controller-side calculation result in the verification ECU 10 from the data sequence and the encryption code stored in the memory 11, and determining whether the terminal-side calculation result matches the controller-side calculation result. In the present example, the first authentication unit 30 includes a controller-side authentication unit 30a arranged on the verification ECU 10 and a terminal-side authentication unit 30b arranged on the key control unit 20.

In the present example, the code authentication is challenge-response authentication. In this case, the data sequence is a challenge code including a random number. The mobile terminal 2 calculates a terminal-side response code from the challenge code and the encryption code. The verification ECU 10 calculates a controller-side response code from the challenge code and the encryption code. The first authentication unit 30 determines whether the terminal-side response code matches the controller-side response code to determine whether the challenge-response authentication is accomplished. When the challenge-response authentication is not accomplished, the first authentication unit 30 determines that the smart verification is not accomplished. In this case, the verification ECU 10 prohibits actuation of the on-board device.

The authentication system 3 has an unauthorized communication detection function (unauthorized communication accomplishment prevention system 40) that determines the validity of a positional relationship between the vehicle 1 and the mobile terminal 2 to detect an unauthorized communication. In the present example, the unauthorized communication accomplishment prevention system 40 measures a parameter corresponding to the positional relationship between the vehicle 1 and the mobile terminal 2 through encryption communication and determines whether the communication between the mobile terminal 2 and the verification ECU 10 is valid based on the parameter. The unauthorized communication accomplishment prevention system 40 is provided as a measure against a fraudulent action that, for example, connects the mobile terminal 2 located far from the vehicle 1 to the vehicle 1 through unauthorized wireless communication using a relay unit or the like to accomplish the smart verification. In the present example, the parameter corresponding to the positional relationship is the distance (measured distance value) between the mobile terminal 2 and the vehicle 1. The unauthorized communication accomplishment prevention system 40 analyzes the wireless communication performed between the mobile terminal 2 and the vehicle 1 to determine whether the distance between the mobile terminal 2 and the vehicle 1 is short enough (whether the distance is valid and does not allow unauthorized communication) so that the validity of the communication is determined. More specifically, distance detection is applied to the unauthorized communication detection process.

The unauthorized communication accomplishment prevention system 40 includes a distance measurement ECU 41, which corresponds to a second controller arranged on the vehicle 1. The second controller is used as an unauthorized communication detector. In the unauthorized communication accomplishment prevention system 40, the verification ECU 10 is used as a master controller 42 that mainly controls actuation of the distance measurement ECU 41. In the present example, the verification ECU 10 and the distance measurement ECU 41 are connected by an in-vehicle communication line 43. The communication line 43 is, for example, a controller area network (CAN) and/or a local interconnect network (LIN). Although not illustrated in the drawings, the communication line 43 is also connected to an ECU that controls the door lock device and an ECU that controls actuation of the engine. For example, the verification ECU 10 provides a control signal S0 (for example, refer to FIG. 3) to the distance measurement ECU 41 through the communication line 43 to cause the distance measurement ECU 41 to execute the unauthorized communication detection process (distance detection).

The distance measurement ECU 41 communicates with the mobile terminal 2 using, for example, an ultra-wide band (UWB) radio wave to measure the parameter (measured distance value) corresponding to the positional relationship between the vehicle 1 and the mobile terminal 2. In the present example, the vehicle 1 includes a second communicator 44, and the mobile terminal 2 includes a second communicator 45 so that the unauthorized communication detection process is executed through wireless communication between the distance measurement ECU 41 and the mobile terminal 2. In the present example, the second communicators 44 and 45 communicate with each other using a UWB radio wave.

The authentication system 3 includes a second authentication unit 50 that applies encryption communication using a portion of the terminal-side calculation result and a portion of the controller-side calculation result to communication performed between the distance measurement ECU 41 and the mobile terminal 2 to authenticate the encryption communication. The second authentication unit 50 executes the unauthorized communication detection process (distance detection). Thus, the distance detection is securely performed through the encryption communication performed between the distance measurement ECU 41 and the mobile terminal 2. In the present example, the second authentication unit 50 includes a controller-side authentication unit 50a arranged on the distance measurement ECU 41 and a terminal-side authentication unit 50b arranged on the key control unit 20. The second authentication unit 50 transmits and receives a distance measurement signal Sd as a UWB radio wave between the controller-side authentication unit 50a (distance measurement ECU 41) and the terminal-side authentication unit 50b (key control unit 20) to calculate the distance (measured distance value) between the mobile terminal 2 and the vehicle 1 from the propagation time of the distance measurement signal Sd. The second authentication unit 50 determines whether the communication between the mobile terminal 2 and the distance measurement ECU 41 (vehicle) is valid based on the measured distance value. For example, when the measured distance value is less than or equal to a predetermined threshold value, the second authentication unit 50 determines the communication is valid. The function that determines whether communication is valid may be included in at least one of the controller-side authentication unit 50a or the terminal-side authentication unit 50b. In the present example, the terminal-side authentication unit 50b has the determination function. When the communication (in the present example, measured distance value) is determined to be invalid, the verification ECU 10 prohibits actuation of the on-board device.

In the present example, the second authentication unit 50 uses a portion of the terminal-side response code and a portion of the controller-side response code in the encryption communication performed between the mobile terminal 2 and the distance measurement ECU 41 when executing the unauthorized communication detection process. For example, when transmitting the distance measurement signal Sd from the mobile terminal 2 to the distance measurement ECU 41, the terminal-side authentication unit 50b transmits a distance measurement signal Sd that includes a portion of the terminal-side response code to the controller-side authentication unit 50a. The controller-side authentication unit 50a determines whether the portion of the received terminal-side response code matches the corresponding portion of the controller-side response code. If it is determined that the codes match, the encryption communication performed from the mobile terminal 2 to the distance measurement ECU 41 is authenticated. Also, when transmitting the distance measurement signal Sd from the distance measurement ECU 41 to the mobile terminal 2, the controller-side authentication unit 50a transmits a distance measurement signal Sd that includes a portion of the controller-side response code to the terminal-side authentication unit 50b. The terminal-side authentication unit 50b determines whether the portion of the received controller-side response code matches the corresponding portion of the terminal-side response code. If it is determined that the codes match, the encryption communication performed from the distance measurement ECU 41 to the mobile terminal 2 is authenticated. If one of the controller-side authentication unit 50a and the terminal-side authentication unit 50b determines that authentication of the encryption communication is not accomplished, the communication between the mobile terminal 2 and the distance measurement ECU 41 is disconnected to stop the unauthorized communication detection process.

Figure 2:
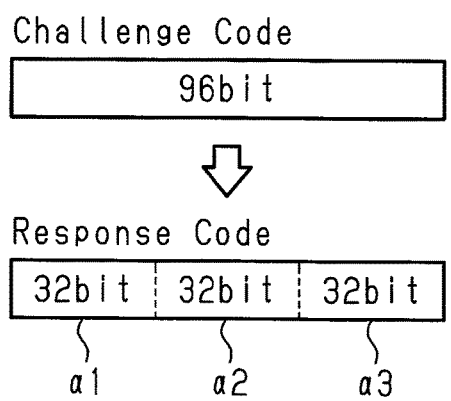
FIG. 2 is a diagram illustrating an example of a configuration of a challenge code and a response code.

As illustrated in FIG. 2, in the present example, a challenge code is generated as a 96-bit data sequence in the challenge-response authentication. The challenge code may be generated by one of the key control unit 20 (mobile terminal 2) and the verification ECU 10, which serves as a source device of transmission. In the present example, the challenge code is generated by the verification ECU 10. Each of the key control unit 20 and the verification ECU 10 calculates a response code as a 96-bit data sequence from the challenge code. In the present example, when used, the response code is divided into a first response code al, a second response code $\alpha 2$, and a third response code $\alpha 3$. The first response code al is the most significant 32-bit data sequence. The second response code $\alpha 2$ is the next 32-bit data sequence. The third response code $\alpha 3$ is the least significant 32-bit data sequence. In the present example, the first response code a1 is used in the code authentication (challenge-response authentication) executed through communication performed between the mobile terminal 2 and the verification ECU 10. The second and third response codes α2 and α3 are used in authentication of encryption communication performed between the mobile terminal 2 and the distance measurement ECU 41 when executing the unauthorized communication detection process (distance detection).

In the challenge-response authentication, each of the key control unit 20 (mobile terminal 2) and the verification ECU 10 calculates a response code from a challenge code and an encryption code to obtain the first response code α1, the second response code α2, and the third response code α3. The distance measurement ECU 41 obtains the second response code α2 and the third response code α3 from the verification ECU 10 through the communication line 43.

The operation of the authentication system 3 will now be described with reference to FIGS. 3 and 4.

Figure 3:
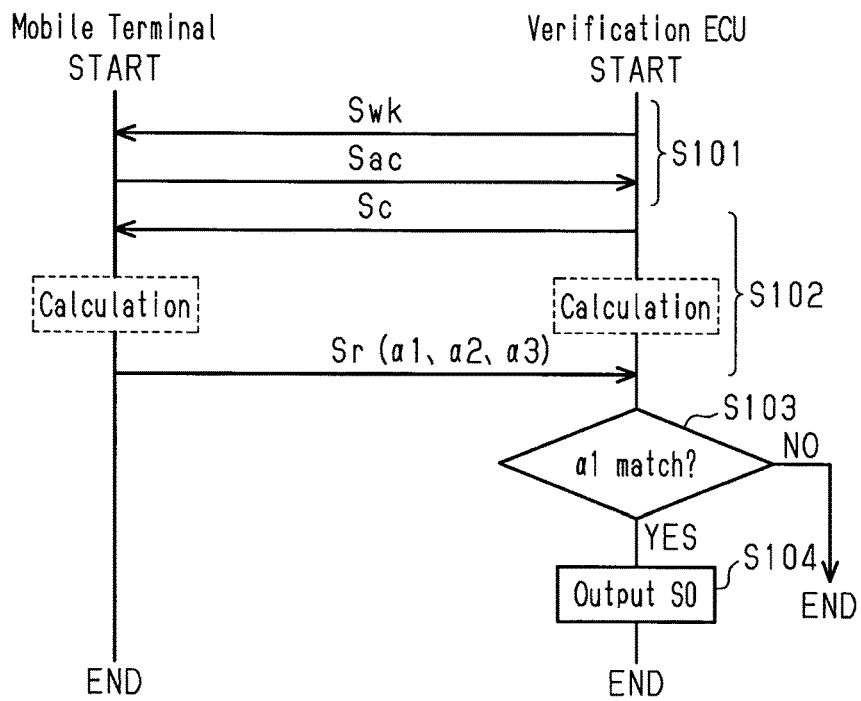
FIG. 3 is a flowchart schematically illustrating an authentication process executed through communication performed between a mobile terminal and a verification ECU (first controller).

As illustrated in FIG. 3, in step S101, the verification ECU 10 transmits a wake signal Swk as an LF radio wave to a vehicle near area using polling. When the mobile terminal 2 enters an area near the vehicle (i.e., communication area of wake signal Swk), the mobile terminal 2 receives the wake signal Swk. In response to reception of the wake signal Swk, the key control unit (mobile terminal 2) is activated from a standby state and starts smart verification. When switched to the activation state, the mobile terminal 2 transmits an ack signal Sac as a UHF radio wave. When the ack signal Sac is received from the mobile terminal 2, the verification ECU 10 proceeds to step S102.

In step S102, the controller-side authentication unit 30a (verification ECU 10) transmits a challenge signal Sc as an LF radio wave including a challenge code. The challenge code may be a random number having a value that changes whenever transmitted. The challenge code may be a 96-bit data sequence. When the key control unit 20 (mobile terminal 2) receives the challenge signal Sc, the terminal-side authentication unit 30b calculates a terminal-side response code from the challenge code and the encryption code. In the same manner, in the verification ECU 10, the controller-side authentication unit 30a also generates a controller-side response code from the challenge code and the encryption code. Each response code includes a 32-bit first response code a1, a 32-bit second response code α2, and 32-bit third response code α3. The terminal-side authentication unit 30b transmits a response signal Sr that includes the terminal-side response code (first to third response codes a1, α2, and α3) to the controller-side authentication unit 30a. At this time, the terminal-side authentication unit 30b also transmits the electronic key ID. For example, the terminal-side authentication unit 30b transmits a response signal Sr that includes the terminal-side response code and the electronic key ID to the controller-side authentication unit 30a.

In step S103, the controller-side authentication unit 30a obtains the terminal-side first response code a1 from the received response signal Sr and compares the terminal-side first response code a1 with the controller-side first response code a1. If the two first response codes a1 match, the controller-side authentication unit 30a determines that the code authentication (challenge-response authentication) is accomplished. At this time, although not illustrated in FIG. 3, the controller-side authentication unit 30a also executes the ID authentication by verifying the electronic key ID of the mobile terminal 2. If the code authentication and the ID authentication are both accomplished, the controller-side authentication unit 30a proceeds to step S104. If at least one of the code authentication or the ID authentication is not accomplished, the controller-side authentication unit 30a determines that the smart verification is not accomplished and prohibits actuation of the on-board device.

In step S104, the verification ECU 10 provides the control signal S0 to the distance measurement ECU 41 so that the distance measurement ECU 41 executes the unauthorized communication detection process. In the present example, the control signal S0 includes the second response code α2 and the third response code α3.

Figure 4:
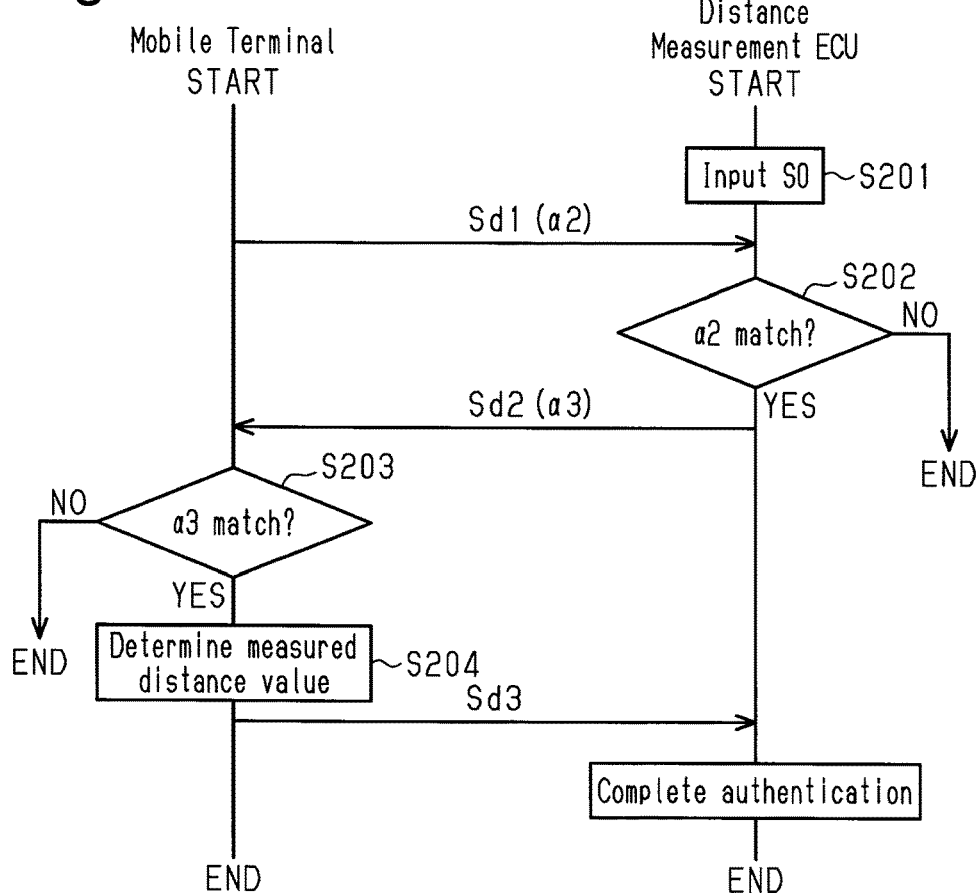
FIG. 4 is a flowchart schematically illustrating an authentication process executed through communication performed between a mobile terminal and a distance measurement ECU (second controller).

As illustrated in FIG. 4, in step S201, in response to reception of the control signal S0, the controller-side authentication unit 50a of the distance measurement ECU 41 starts the unauthorized communication detection process (distance detection). The controller-side authentication unit 50a obtains the second and third response codes α2 and α3 from the control signal S0. The controller-side authentication unit 50a waits for the terminal-side authentication unit 50b of the mobile terminal 2 to transmit a first distance measurement signal Sd1. The terminal-side authentication unit 50b transmits the first distance measurement signal Sd1 as a UWB radio wave when a predetermined amount of time has elapsed from when the control signal S0 is output from the verification ECU 10 (for example, from when the response signal Sr is output from the key control unit 20). In the present example, the first distance measurement signal Sd1 includes the second response code α2 and a synchronization bit that synchronizes the controller-side authentication unit 50a with the terminal-side authentication unit 50b. The terminal-side authentication unit 50b starts to measure the time from when the first distance measurement signal Sd1 is transmitted.

In step S202, the controller-side authentication unit 50a of the distance measurement ECU 41 verifies the received terminal-side second response code α2. If the terminal-side second response code α2 matches the controller-side second response code α2, the controller-side authentication unit 50a determines that authentication of encryption communication using the (terminal-side and controller-side) second response codes α2 is accomplished. When the authentication of the encryption communication is accomplished, the controller-side authentication unit 50a transmits a second distance measurement signal Sd2 as an UWB radio wave. In the present example, the second distance measurement signal Sd2 includes the above-described synchronization bit and the third response code α3. If the authentication of encryption communication using the second response codes α2 is not accomplished, the controller-side authentication unit 50a determines that the communication between the mobile terminal 2 and the distance measurement ECU 41 (vehicle 1) is invalid and does not transmit the second distance measurement signal Sd2. Thus, the unauthorized communication detection process is stopped. In this case, the verification ECU 10 prohibits actuation of the on-board device.

In step S203, the terminal-side authentication unit 50b of the mobile terminal 2 verifies the received controller-side third response code α3. If the controller-side third response code α3 matches the terminal-side third response code α3, the terminal-side authentication unit 50b determines the authentication of encryption communication using the (terminal-side and controller-side) third response codes α3 is accomplished. If the authentication of the encryption communication is accomplished, the terminal-side authentication unit 50b proceeds to step S204. If the authentication of encryption communication using the third response codes α3 is not accomplished, the terminal-side authentication unit 50b determines that the communication between the mobile terminal 2 and the distance measurement ECU 41 (vehicle 1) is invalid and stops the unauthorized communication detection process.

In step S204, the terminal-side authentication unit 50*b* of the mobile terminal 2 calculates the distance (measured distance value) between the mobile terminal 2 and the vehicle 1 based on a propagation time. The propagation time is an amount of time from when the first distance measurement signal Sd1 is transmitted to when the second distance measurement signal Sd2 is received. If the measured distance value is less than or equal to a predetermined threshold value, the terminal-side authentication unit 50*b* determines that the communication between the mobile terminal 2 and the vehicle 1 is valid and transmits a third distance measurement signal Sd3 that includes the determination result (report of valid communication) to the controller-side authentication unit 50*a*. When the determination result is received from the controller-side authentication unit 50*a* (distance measurement ECU 41), the verification ECU 10 allows actuation of the on-board device. When a report that the communication is invalid is received, the verification ECU 10 prohibits actuation of the on-board device. The third distance measurement signal Sd3 may include a portion of the response code, and the controller-side authentication unit 50*a* of the distance measurement ECU 41 may again verify the portion of the response code (authenticate encryption communication).

As described above, the unauthorized communication accomplishment prevention system 40 determines the validity of communication through the unauthorized communication detection process (distance detection). Thus, for example, even when the mobile terminal 2 is located far away from the vehicle 1 and a fraudulent action is performed using a relay unit, it is determined that the measured distance value (distance) obtained by the distance detection is invalid. Hence, the on-board device will not be actuated.

For example, an "impersonation action," in which an impersonating transmitter is used to pretend that communication is valid, may be performed. The impersonating transmitter, which has intercepted communication of a past distance detection and copied the distance measurement signal Sd, uses the copied signal to perform unauthorized communication. The impersonation action is a fraudulent action such that the impersonating transmitter is placed in the vicinity of the mobile terminal 2 (or vehicle 1) to tamper with the measured distance value of the mobile terminal 2 and the vehicle 1, which are actually located far away from each other. In this regard, in the present example, the second authentication unit 50 applies encryption communication to communication performed between the mobile terminal 2 and the distance measurement ECU 41 and authenticates the encryption communication. Additionally, the encryption communication uses a response code that is unique to each communication. Thus, even when the impersonating action is performed, the impersonating transmitter does not have the legitimate response code and will fail to accomplish authentication of the encryption communication. That is, even when the impersonating action is performed, it is determined that the communication is invalid.

The present embodiment has the advantages described below.

(1) The authentication system 3 includes the first authentication unit 30 and the second authentication unit 50. The first authentication unit 30 executes the ID authentication and the code authentication through wireless communication performed between the mobile terminal 2 and the verification ECU 10. The second authentication unit 50 applies encryption communication that uses a portion of the terminal-side response code and a portion of the controller-side response code to communication performed between the mobile terminal 2 and the distance measurement ECU 41 to authenticates the encryption communication. With this configuration, when performing encryption communication between the mobile terminal 2 and the distance measurement ECU 41, there is no need to execute a process for the code authentication (process of transmitting a data sequence from one of the mobile terminal 2 and the distance measurement ECU 41 to the other and calculating a code from the data sequence and the encryption code in each of the mobile terminal 2 and the distance measurement ECU 41). This limits increases in the number of processes executed for encryption communication while securely performing communication between the mobile terminal 2 and the distance measurement ECU 41.

(2) The second authentication unit 50 measures a measured distance value corresponding to the distance between the mobile terminal 2 and the verification ECU 10 through encryption communication performed between the mobile terminal 2 and the verification ECU 10 and determines whether the communication between the mobile terminal 2 and the verification ECU 10 is valid based on the measured distance value. With this configuration, when the mobile terminal 2 and the verification ECU 10 communicate with each other, the validity of the communication is determined in addition to the ID authentication and the code authentication. This improves the security of the authentication system 3.

(3) In communication performed from the mobile terminal 2 to the distance measurement ECU 41, the second authentication unit 50 authenticates encryption communication by transmitting the second response code $\alpha 2$ from the mobile terminal 2 to the distance measurement ECU 41 and verifying the second response code $\alpha 2$ with the distance measurement ECU 41. Thus, when performing communication from the mobile terminal 2 to the distance measurement ECU 41, the encryption communication is authenticated without performing bidirectional communication such as challenge-response authentication. In the same manner, in communication performed from the distance measurement ECU 41 to the mobile terminal 2, the second authentication unit 50 authenticates encryption communication by transmitting the third response code $\alpha 3$ from the distance measurement ECU 41 to the mobile terminal 2 and verifying the third response code $\alpha 3$ by the mobile terminal 2. Thus, when performing communication from the distance measurement ECU 41 to the mobile terminal 2, the encryption communication is also authenticated without performing bidirectional communication. This reduces a number of processes of encryption communication.

(4) The verification ECU 10 is the master controller 42, which mainly controls actuation of the distance measurement ECU 41. The distance measurement ECU 41 obtains the second response code $\alpha 2$ and the third response code $\alpha 3$ from the verification ECU 10. With this configuration, the distance measurement ECU 41 obtains the second and third response codes $\alpha 2$ and $\alpha 3$, which are used in encryption communication, from the verification ECU 10. This eliminates the need for calculation of the second response code $\alpha 2$ and the third response code $\alpha 3$. This reduces processing loads on the distance measurement ECU 41.

(5) The mobile terminal 2 receives a challenge code from the verification ECU 10 to calculate a response code for challenge-response authentication and obtains a portion (second and third response codes $\alpha 2$ and $\alpha 3$) of the response code used in encryption communication from the calculated response code. As described above, the mobile terminal 2 uses a portion of the response code used in the code authentication as an encryption code for encryption communication between the mobile terminal 2 and the distance measurement ECU 41. This reduces a number of processes of encryption communication.

(6) The code authentication is challenge-response authentication. With this configuration, a portion of the response code of challenge-response authentication is used to perform encryption communication between the mobile terminal 2 and the distance measurement ECU 41. This reduces a number of processes of encryption communication. Additionally, the challenge code is generated as a code that is unique to each communication. This improves the security of communication.

The above embodiment may be modified as described below.

The embodiment described above and the modified examples described below can be combined as long as the combined modifications remain technically consistent with each other.

In the embodiment, the code authentication is not limited to challenge-response authentication and may be any authentication in which a code is calculated from a data sequence and an encryption code and the code is used in the authentication. The data sequence may have a value unique to the controller.

In the embodiment, the response code may be calculated multiple times. For example, the first response code α1, the second response code α2, and the third response code α3 may be separately calculated. However, when the response codes are calculated once, increases in the number of calculation processes and communication processes are limited.

The embodiment may include two or more distance measurement ECUs 41. When two or more distance measurement ECUs 41 are included, the number of division of a response code may be changed in accordance with the number of distance measurement ECUs 41. In this case, the authentication may be executed by using divided response codes that differ between the distance measurement ECUs 41 and/or using two or more divided response codes for each distance measurement ECU 41. Such configurations improve the security.

In the embodiment, the process of distance measurement is not limited to a process based on the propagation time of a radio wave and may be a process based on the signal reception strength of a radio wave.

In the embodiment, the third distance measurement signal Sd3 may be UHF-transmitted to the verification ECU 10 or may be UWB-transmitted to the distance measurement ECU 41.

In the embodiment, at least one of the vehicle 1 or the mobile terminal 2 may have the function that analyzes a distance measurement signal and calculates a measured distance value to determine the validity of the measured distance value in the second authentication unit 50. When the vehicle 1 has the function, the third distance measurement signal Sd3 may be omitted.

In the embodiment, the second controller (unauthorized communication detector) is not limited to the distance measurement ECU 41 and may be another controller that determines the validity of communication. More specifically, the parameter corresponding to the positional relationship between the mobile terminal 2 and the first controller is not limited to the distance (measured distance value) between the vehicle 1 and the mobile terminal 2. For example, the parameter corresponding to the positional relationship between the mobile terminal 2 and the first controller may be the position (coordinate) of the mobile terminal 2 in relation to the vehicle 1 or may be a combination of the distance between the vehicle 1 and the mobile terminal 2 and the position (coordinate) of the mobile terminal 2.

In the embodiment, the second authentication unit 50 does not necessarily have to determine the validity of communication. More specifically, the second authentication unit 50 may simply authenticate encryption communication between the mobile terminal 2 and the second controller. The authentication of encryption communication determines the validity of communication between the mobile terminal 2 and the second controller. However, when the unauthorized communication detection process such as the distance detection is executed, the security is improved.

In the embodiment, encryption communication performed between the mobile terminal 2 and the distance measurement ECU 41 is not limited to simple authentication of a portion of a response code. For example, a portion of a response code may be used for encryption and decryption. For example, when communication is performed from one of the mobile terminal 2 and the distance measurement ECU 41 to the other, a cryptogram generated using the second response code α2 may be transmitted, and the cryptogram may be decrypted by the other one of the mobile terminal 2 and the distance measurement ECU 41. This case also eliminates the need for bidirectional communication in authentication of encryption communication.

In the embodiment, instead of providing the calculation results (second and third response codes α2 and α3) to the distance measurement ECU 41, the verification ECU 10 may, for example, transmit a challenge code to the distance measurement ECU 41. In this case, the distance measurement ECU 41 calculates a response code from the received challenge code. However, when the verification ECU 10 provides the calculation results (α2 and α3) to the distance measurement ECU 41, the distance measurement ECU 41 does not need to calculate the response code.

In the embodiment, before the response signal Sr is received from the mobile terminal 2, the verification ECU 10 may provide the calculation results (e.g., second and third response codes α2 and α3) to the distance measurement ECU 41. Alternatively, the verification ECU 10 may transmit a response code calculated by the controller-side authentication unit 30a to the distance measurement ECU 41 regardless of the determination result of the code authentication.

In the embodiment, when the authentication executed by the first authentication unit 30 and the authentication executed by the second authentication unit 50 are not accomplished, actuation of the on-board device only may be prohibited. The authentication process may be configured not to be related to smart verification. For example, the authentication executed by the first authentication unit 30 and the authentication executed by the second authentication unit 50 does not need to be a condition for the smart verification. Alternatively, when the authentication executed by the first authentication unit 30 and the authentication executed by the second authentication unit 50 are not accomplished, the smart verification may be determined to be invalid.

In the embodiment, the verification ECU 10 and the distance measurement ECU 41 do not necessarily have to be connected by the wire communication line 43 and may perform wireless communication with each other. The communication between the verification ECU 10 and the distance measurement ECU 41 may be encrypted.

In the embodiment, the process of distance measurement may be changed. For example, radio waves may be transmitted through multiple channels, propagation characteristics of the radio waves may be measured for each channel, a predetermined calculation may be performed based on the measured values of the channels to obtain the distance between the mobile terminal 2 and the distance measurement ECU 41 (vehicle 1).

In the embodiment, the length of each of a challenge code and a response code is not limited to 96 bits and may be changed. Additionally, the data length may differ between the challenge code and the response code. Each divided response code may have any data length, and the response code does not necessarily have to be equally divided.

In the embodiment, the number of divisions of a response code may be changed. A portion of the response code does not necessarily have to be used in a series of the process of smart verification.

In the embodiment, the kind of on-board device is not particularly limited.

In the embodiment, the communication band for smart verification and the band used in communication for the unauthorized communication detection process are not particularly limited.

In the embodiment, in the authentication system 3, the mobile terminal 2 may transmit the wake signal Swk.

In the embodiment, in the smart verification (ID authentication and code authentication), LF radio waves are used to transmit signals form the vehicle 1 to the mobile terminal 2, and UHF radio waves are used to transmit signals from the mobile terminal 2 to the vehicle 1. The smart verification is not limited to the use of LF-UHF bidirectional communication. For example, outgoing transmission and incoming transmission may use radio waves of the same frequency band as long as the validity of the mobile terminal 2 is determined through wireless communication.

In the embodiment, the positions of the first communicator 12 and the second communicator 44 in the vehicle 1 are not particularly limited. For example, LF antennas may be installed outside and inside the vehicle or may be installed at the left and right sides of the vehicle 1 without distinguishing the inside and the outside of the vehicle. The authentication system 3 may determine whether the mobile terminal 2 is located inside the vehicle or outside the vehicle by detecting whether communication is accomplished outside the vehicle or inside the vehicle when executing ID verification.

In the embodiment, the mobile terminal 2 is not limited to an electronic key and may be, for example, a high-performance mobile phone such as a smartphone.

In the embodiment, the controllers (first and second controllers) are not limited to on-board controllers and may be changed to various units or devices.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An authentication system, comprising:
    a first controller that performs wireless communication with a mobile terminal;
    a first authentication unit that executes authentication of the mobile terminal through the wireless communication performed between the first controller and the mobile terminal, wherein the authentication of the mobile terminal includes identification (ID) authentication and code authentication, and the first authentication unit executes the code authentication by transmitting a data sequence from one of the mobile terminal and the first controller to the other of the mobile terminal and the first controller, obtaining a terminal-side calculation result from the data sequence and an encryption code by the mobile terminal, obtaining a controller-side calculation result from the data sequence and the encryption code by the first controller, and determining whether the terminal-side calculation result matches the controller-side calculation result;
    a second controller that communicates with the mobile terminal; and
    a second authentication unit that applies encryption communication using a portion of the terminal-side calculation result and a portion of the controller-side calculation result to communication performed between the second controller and the mobile terminal and authenticates the encryption communication.

2. The authentication system according to claim 1, wherein the second authentication unit measures a parameter corresponding to a positional relationship between the mobile terminal and the first controller through the encryption communication and determines whether the wireless communication between the mobile terminal and the first controller is valid based on the parameter.

3. The authentication system according to claim 1, wherein the second authentication unit authenticates the encryption communication by transmitting a first portion of the terminal-side calculation result from the mobile terminal to the second controller and determining whether the first portion of the terminal-side calculation result matches a first portion of the controller-side calculation result with the second controller.

4. The authentication system according to claim 1, wherein the second authentication unit authenticates the encryption communication by transmitting a second portion of the controller-side calculation result from the second controller to the mobile terminal and determining whether the second portion of the controller-side calculation result matches a second portion of the terminal-side calculation result with the mobile terminal.

5. The authentication system according to claim 1, wherein the first authentication unit executes the code authentication by determining whether a third portion of the terminal-side calculation result matches a third portion of the controller-side calculation result.

6. The authentication system according to claim 1, wherein
    the first controller is a master controller that controls actuation of the second controller, and
    the second controller obtains the portion of the controller-side calculation result from the master controller.

7. The authentication system according to claim 1, wherein the mobile terminal receives the data sequence from the first controller and calculates the terminal-side calculation result for the code authentication to obtain the portion of the terminal-side calculation result used in the encryption communication from the terminal-side calculation result.

8. The authentication system according to claim 1, wherein
- the code authentication is challenge-response authentication,
- the data sequence is a challenge code including a random number, and
- the first authentication unit determines whether the challenge-response authentication is accomplished by determining whether a terminal-side response code calculated by the mobile terminal matches a controller-side response code calculated by the first controller.

9. An authentication method, comprising:
- executing authentication of a mobile terminal including identification (ID) authentication and code authentication through wireless communication performed between a first controller and the mobile terminal, wherein the code authentication includes
  - transmitting a data sequence from one of the mobile terminal and the first controller to the other of the mobile terminal and the first controller,
  - obtaining, by the mobile terminal, a terminal-side calculation result from the data sequence and an encryption code,
  - obtaining, by the first controller, a controller-side calculation result from the data sequence and the encryption code, and
  - determining whether the terminal-side calculation result matches the controller-side calculation result, and
- applying encryption communication which uses a portion of the terminal-side calculation result and a portion of the controller-side calculation result to communication performed between the second controller and the mobile terminal and authenticating the encryption communication.

* * * * *